(12) United States Patent
Sun et al.

(10) Patent No.: US 8,006,005 B2
(45) Date of Patent: Aug. 23, 2011

(54) CENTRALIZED POLLING SERVICE

(75) Inventors: Jianli Sun, Kanata (CA); Maciej Syrowatka, Kanata (CA); Trevor Pound, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1000 days.

(21) Appl. No.: 11/903,438

(22) Filed: Sep. 21, 2007

(65) Prior Publication Data

US 2009/0083455 A1 Mar. 26, 2009

(51) Int. Cl.
*G06F 13/22* (2006.01)
(52) U.S. Cl. .......................................... 710/46; 719/314
(58) Field of Classification Search .................. None
See application file for complete search history.

(56) References Cited

U.S. PATENT DOCUMENTS

| | | | |
|---|---|---|---|
| 5,752,159 A | 5/1998 | Faust | |
| 5,828,882 A | 10/1998 | Hinckley | |
| 7,024,184 B2 * | 4/2006 | Erb et al. | 455/417 |
| 7,051,337 B2 * | 5/2006 | Srikantan et al. | 719/318 |
| 7,778,191 B2 * | 8/2010 | Sun | 370/244 |
| 2001/0029548 A1 * | 10/2001 | Srikantan et al. | 709/250 |
| 2002/0085555 A1 * | 7/2002 | Jung | 370/389 |
| 2003/0182423 A1 * | 9/2003 | Shafir et al. | 709/225 |
| 2006/0090165 A1 | 4/2006 | Martin | |

OTHER PUBLICATIONS 4.2 Berkley Distribution; "BSD System Calls Manual"; Mar. 25, 1994; 4.2 Berkley Distribution.*
Hyde, Randall "Chapter Seven The I/O Subsystem" 2003, XP002594653 from Internet: URL:http://net.pku.edu.cn/~course/cs201/2003/html/IO.html.
Langendoen, K. et al. "Integrating polling, interrupts, and thread management" Frontiers of Massively Parallel Computing, 1996. pp. 13/22 IEEE Comput. Soc. US LNKD; XP010201572.

* cited by examiner

*Primary Examiner* — H S Sough
*Assistant Examiner* — Umut Onat

(57) ABSTRACT

A centralized polling system is set forth for providing constant time select call functionality to a plurality of polling tasks in an operating system kernel. In one aspect, the CPS registers for and thereby captures events of interest on a continual basis. Polling tasks are supplied with active events thereby eliminating the need to repetitively poll large numbers of inactive sockets. An exemplary embodiment of the CPS includes a system interface to the operating system kernel, a data structure for maintaining a profile for each of the polling tasks, and an application programming interface for registering the polling tasks, receiving the active sockets and corresponding read/write event types via the system interface, updating the profile within the data structure for each of the polling tasks, and returning the current read and write ready sockets to respective ones of the polling tasks.

19 Claims, 10 Drawing Sheets

```
void RegisterForSockService(int taskId, int& serviceNum);
void DeRegisterForSockService(int taskId, int serviceNum);

int Add (int fd, int ioEvent, int serviceNum, int taskId);
int Clear(int fd, int ioEvent, int serviceNum, int taskId);

int Select (int ioEvent, int serviceNum, int taskId, int timeout = 0);

int GetNextReadyFd (int ioEvent, int serviceNum, int taskId);
```

Figure 4A

```
void wakeupCallback (struct socket *so, SELECT_TYPE wakeupType);

void BindingCallbackToKernel()
{
    if (sowakeupHook == NULL)
    {
        sowakeupHook = (VOIDFUNCPTR)wakeupCallback;
    }
}
```

Figure 4B

CENTRALIZED POLLING SERVICE

BACKGROUND

1. Field

The present specification relates generally to client-server systems, and more particularly to the problem of socket handling for VoIP and collaborative systems.

2. Description of the Related Art

VoIP and collaborative systems currently use standard commercial operating systems, such as VxWorks, in order to leverage economies of scale. VxWorks is a single-process operating system (derived from the general-purpose BSD 4.3 of UNIX systems), where all concurrent threads (or tasks) share a global memory space. Originally, each UNIX process is assumed to have a small number (e.g., 64) of file descriptors (also known as sockets) but VxWorks extends it to a larger set (e.g., 2048).

Standard commercial operating systems supply socket-handling facilities whose design is based on assumptions that are not valid for VoIP and collaborative systems. For example, VxWorks utilizes a polling system that reaches its maximum efficiency with extensive use of relatively few sockets, whereas VoIP systems typically have a large number of peripheral devices each of which needs to be supplied with socket services that, even under heavy load conditions, result in relatively light socket usage.

Typically, I/O multiplexing is performed over a large number of sockets using industry standard (i.e. BSD 4.3-compatible) socket services such as "select" or "poll". However, the use of standard socket services results in high computing overhead and poor scalability. Specifically, on each polling task, the operating system (OS) kernel must search across many sockets to find the relatively few ones with active events, and it must do so for each of several applications that are active at one time.

In general, there are three basic models or methods for socket I/O multiplexing. A first method is to spawn a task (i.e., a thread) for each TCP connection wherein each task handles one socket I/O. However, this method works only for small and simple systems. It cannot be applied to a system handling a large number of sockets because it results in a large number of tasks being created in the system, causing high memory cost and excessive system processing overhead.

A second method is to use a single task to control (i.e. multiplex) a group of sockets. This task continually makes a select call (i.e. select( )), with a predetermined non-zero timeout value, which allows the select( ) call to wait until an I/O event arrives at any given socket before the waiting time expires.

The third method, referred to herein as the "polling model", is similar to the second method except that it periodically polls the set of sockets, wherein each poll call (i.e. poll( )) returns immediately. By polling the sockets, the computational overhead is reduced when compared to the second method by making system calls less frequently and collecting more I/O ready socket events with each call. One problem, however, with the "polling model" method is that it introduces a response delay to the I/O events.

It should be noted that VxWorks does not support poll( ). However, a person of ordinary skill in the art will appreciate that a "select" call having zero timeout value is logically equivalent to poll( ). Both select and poll are theoretically of the same computational complexity (although poll may have a small factor of improvement over select in some operating systems). Since all such systems nonetheless require sequential checking of the list of N sockets, for the sake of convenience this specification occasionally uses the terms "select" and "poll" interchangeably.

Heuristic methods have been used to find the best value of polling interval, or polling window (PW), for a particular system. Usually, PW is related to a set of system attributes, such as: maximum number of IP phones supported; maximum traffic throughput (Calls-Per-Hour); minimum I/O delay, etc.

An increase in N results in an increase in PW. However, an increased N is also associated with an increased traffic requirement, which in turn requires a smaller PW. Reducing the PW value increases the traffic throughput (or reduces the I/O delay); but increases the CPU consumption. For a given system with limited CPU resources, the choice of PW ends up being a tradeoff of system attributes to control I/O multiplexing overhead within an acceptable range.

As an example of the foregoing, the MN3300 system manufactured by Mitel Networks Corporation is a distributed TCP/IP client-server system, where a single Integrated Communication Platform (ICP) controller (or a cluster of interconnected ICPs), plays a server role to support up to N=1400 IP phone clients. Each IP phone establishes a TCP socket connection with the ICP for signaling purposes. However, the ICP controller typically must perform I/O multiplexing over a very large number of TCP sockets to communicate with the IP phones. The computational cost of this I/O multiplexing is directly proportional to N (total number of sockets), causing high overhead of O(N) computational time as well as scalability problems when N is large. In an effort to address the scalability problem, in some commercial implementations of the MN3300 system the VxWorks kernel has been re-compiled for select service to support 2048, 4096, and 8192 file descriptors and thereby accommodate an increased number of IP phones.

In the prior art MN3300 system, one task is responsible for polling TCP sockets every PW=40 milliseconds. Thus, for an MN3300 system designed for N=1400 phones and about 8000 CPH traffic throughput under a saturated level of CPU usage, reducing PW from 40 milliseconds to 20 milliseconds can cause some iPBX service outage. To support a larger system, say N=3000, the MN3300 system needs to increase its CPU capacity.

SUMMARY

A centralized polling service (CPS) is set forth that provides equivalent functionality to prior art select services, such as the VxWorks select service, but with a computing complexity of only O(1). The CPS, as set forth in greater detail below, provides optimal I/O multiplexing for user applications without affecting the kernel select service.

From a computational complexity point of view, the method and apparatus set forth herein are optimal, in that a predictable, constant number of steps are executed to detect I/O-related events regardless of the number of sockets. In other words, the disclosed method eliminates the scalability problem discussed above in building large TCP/IP client-server distributed systems, and the resulting computing time is independent of N (total number of TCP sockets).

The centralized polling service (CPS) set forth in detail herein below combines elements of polling and event systems to create a hybrid polling event system. Specifically, applications continue to periodically scan for events thereby eliminating the overhead of pushing individual events to applications. However, applications can also register or subscribe to events of interest thereby eliminating the overhead of polling systems (at both kernel and application layers) being required to search through multiple devices looking for ones with active events.

Thus, in one aspect, whereas it is known in the art that, on each polling task, the OS kernel must search across many sockets for each active application to find the relatively few sockets with active events, the CPS set forth herein effectively centralizes polling services thereby eliminating redundant searching for multiple applications.

In another aspect, the CPS set forth herein also eliminates the prior art requirement that the polling task poll each of many sockets. The ability of the CPS to register for events (similar to event system capabilities), results in capturing events of interest on a continual basis. Thus, polling tasks can be supplied with active events that eliminate the need to repetitively poll large numbers of inactive sockets.

A more extensive discussion of the prior art, and additional details of the solution summarized above are provided hereinafter, reference being had to the accompanying drawings, wherein like numerals refer to like parts throughout.

BRIEF DESCRIPTION OF THE DRAWINGS

FIG. 4A illustrates an Application Programming Interface (API) for a polling task to register and de-register with the centralized polling service (CPS) of FIG. 2;

FIG. 4B illustrates an Application Programming Interface (API) to the operating system kernel for the centralized polling service (CPS) of FIG. 2;

DETAILED DESCRIPTION OF THE PREFERRED EMBODIMENT

Figure 1:
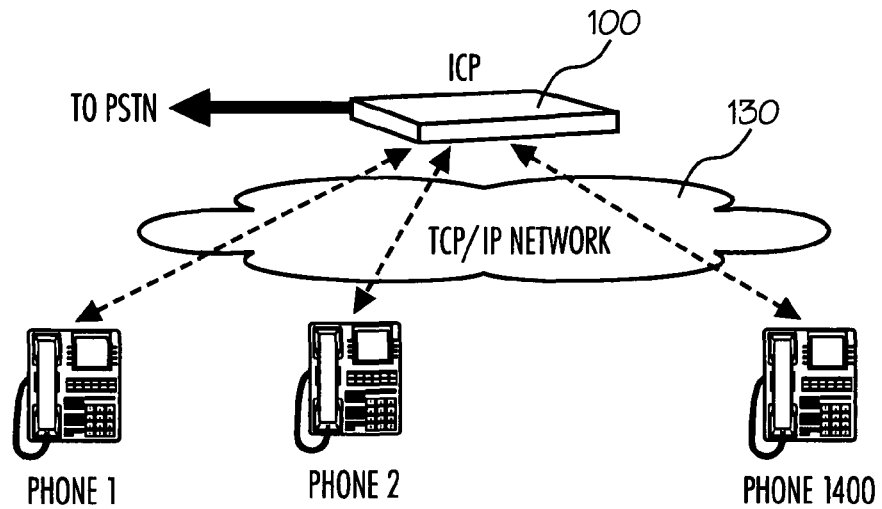
FIG. 1 is a block diagram of a communication system forming the environment of an exemplary embodiment.

With reference to FIG. 1, an exemplary communication system is shown comprising a communication switch, such as the MN3300, ICP (100) manufactured by Mitel Networks Corporation, connected to a local area network or LAN (130) and to the Public Switched Telephone Network (PSTN). A plurality of IP telephone devices such as Phone 1, Phone 2 . . . Phone 1400 are connected to the LAN (130).

A person of skill in the art will appreciate that the configuration of FIG. 1 is representative of a typical converged communication network, and that numerous variations in configuration, components, etc. are possible.

In the exemplary embodiment of FIG. 1, the ICP (100) functions in a server role to support up to N=1400 IP phone clients. Each IP Phone establishes a TCP socket connection with the ICP (100) for signaling purposes. The ICP (100) performs I/O multiplexing over a very large number of TCP sockets in order to communicate with the IP phones. As discussed briefly above, the use of industry standard (i.e. UNIX BSD 4.3 compatible) socket services such as "select" or "poll" to perform socket I/O multiplexing within the ICP, which results in a high computational cost that is directly proportional to N (the total number of sockets). For a prior art MN3300 ICP (100) incorporating a 450 MHz PowerPC processor, a single scan of 1400 TCP sockets takes approximately 10 milliseconds. Overall, the networking I/O functionality consumes approximately 25% of CPU resources even when there is no call-processing traffic between the ICP (100) and the IP phones. As the system line size (N) increases, the computational overhead increases as well, with the result that the existing platform hardware architecture eventually needs to be replaced with a more powerful CPU in order to meet increasing computing resource demands.

The Centralized Polling Service (CPS) set forth herein below with reference to the exemplary embodiments of FIGS. 2-10, completes the "select" functionality for any number of sockets in a small, constant time (e.g. typically less than 8 microseconds instead of 9.8 milliseconds as in the prior art, or approximately 1000 times faster than prior art solutions). Furthermore, the CPS set forth herein is fully scalable in that its computing time remains unchanged even if the total number of TCP sockets increases to N=10,000 or more.

An immediate practical commercial benefit of the CPS described herein is that it provides cost-effective alternatives to building large enterprise systems and server-based applications. For example, it is possible to significantly increase the IP phone line size for existing IPBX systems without requiring any major architectural changes and investments.

As discussed briefly above, the operating system (OS) for the exemplary ICP (100) in the Mitel MN3300 ICP platform is VxWorks, which is a popular UNIX-like operating system suitable for real-time embedded computing. VxWorks provides UNIX BSD 4.3 compatible select service as defined below:

```
int select ( int          width,       /* number of bits to examine from 0 */
    fd_set *      pReadFds,    /* read fds */
    fd_set *      pWriteFds,   /* write fds */
    fd_set *      pExceptFds,  /* exception fds */
    struct timeval * pTimeOut   /* max time to wait, NULL = forever */ )
```

Three parameters (pReadFds, pWriteFds, and pExceptFds) of the fd_set file descriptor mask point to file descriptor (fd) sets wherein each bit corresponds to a particular file descriptor. The pReadFds parameter points to a bit mask that specifies the file descriptors to check for reading. Bits that have been set cause select( ) to remain pending until data is available on any of the corresponding file descriptors. The pWriteFds parameter points to a bit mask that specifies the file descriptors to check for writing. Bits that have been set cause select( ) to remain pending until any of the corresponding file descriptors become writable. The pExceptFds parameter points to a bit mask that specifies the file descriptors to check for exception conditions. The pExceptFds parameter is currently unused in VxWorks, but is provided for UNIX call compatibility.

Thus, a select on a set of socket file descriptors for a read-event can monitor any connected socket, to determine when data has arrived and is ready to be read without blocking (the FIONREAD parameter to the ioctl system call is used to determine exactly how much data is available). A select on a set of socket file descriptors for a read-event can also monitor any listening socket, to determine when a connection can be accepted without blocking, and can also monitor any socket, to detect whether an error has occurred on the socket.

A select on a set of socket descriptors for a write-event can monitor any connecting socket, to determine when a connection is complete, and determine when more data can be sent without blocking (i.e., at least one byte can be sent), and to detect if an error has occurred on the socket.

A select for an exception-event will return 'true' for sockets that have out-of-band data available to be read. A select also returns a 'true' for sockets that are no longer capable of being used (e.g. if a closed or shutdown system call has been executed against them).

The width parameter defines how many bits are examined in the file descriptor sets, and should be set to either the maximum file descriptor value in use plus one, or simply to kernel hard-coded FD_SETSIZE. For example, in an exemplary MN3300 system, such as depicted in FIG. 1, the VxWorks kernel may be re-compiled with FD_SETSIZE=8192.

If pTimeOut is NULL, select( ) will block indefinitely. If pTimeOut is not NULL, but points to a timeval structure with an effective time of zero, the file descriptors in the file descriptor sets will be polled and the results returned immediately. If the effective time value is greater than zero, select( ) will return after the specified time has elapsed, even if none of the file descriptors are ready.

When select( ) returns, it reports how many file descriptors are ready, and it zeros out the file descriptors, and sets only the bits that correspond to file descriptors that are ready.

A well-known prior art BSD kernel implementation of select( ) involves awakening all pended tasks (or processes) in the system at select( ) so that each task can check its input bit masks for a descriptor in connection with which an I/O event has arrived. A task making use of select( ) has to perform a sequential search on the returned bit masks again in order to find out which socket fd is ready.

As discussed above, this amounts to an overhead of O(N) computational time complexity, where N is the maximum number of socket file descriptors used. In short, the computing time of select is directly proportional to N, causing high computing overhead and poor scalability problems when N is large.

The centralized polling service (CPS) set forth in greater detail below dynamically manages a profile for each polling task, which contains the task ID, current polling sockets, and the polling results. It provides similar functionality as a select call, but bypasses the standard kernel select service. The CPS set forth herein obtains the kernel socket asynchronous I/O events, and updates the polling tasks' profiles in constant time. This guarantees an O(1) computing complexity in offering the polling services. The O(N) overhead in prior art select calls is thereby eliminated. The CPS set forth herein independently provides an optimal I/O multiplexing choice for user applications, without affecting the kernel select service.

Figure 2:
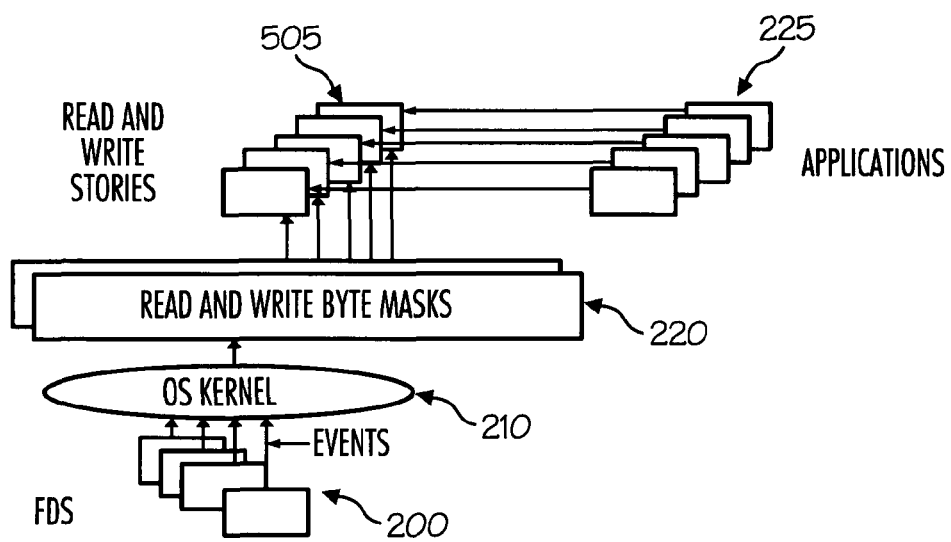
FIG. 2 is a block diagram showing a functional overview of the centralized polling service (CPS) in accordance with an exemplary embodiment.

Turning to FIG. 2, a functional block diagram of the CPS is set forth. A person of skill in the art will appreciate that the block diagram of FIG. 2 and the following description thereof are merely illustrative. A detailed description of an exemplary CPS API is set forth below with reference to FIGS. 3-10.

As shown in FIG. 2, read and write socket events (200) on each of the fds are observed and handled by the OS kernel (210), and supplied to the rest of the CPS via a callback function of VxWorks (discussed in greater detail below with reference to FIG. 4B). The callback function invokes CPS functionality for each event. Read and Write Byte Masks (220), frequently also referred to as Socket Maps, are indexed by the fds and contain the Service Number of the application (225) that has registered to be informed of the event. CPS uses the Service Number to index into a Service List, as discussed in greater detail below with reference to FIG. 5. The Service List is a list of records with each list containing, among other elements, Read and Write Stores (505) for storing read and write socket events for the application identified by the Service Number (i.e. CPS writes the fd of the event into the appropriate store). At suitable intervals, the applications (225) can poll for active events.

Turning briefly to the CPS Application Programming Interface (API), the standard select service requires callers to provide an input bit-mask of file descriptors (fds) at each call even if there is no change to the bit-mask since the last call by the same caller. This requires O(N) time for the select service to check the input bit masks (220). In the exemplary MN3300 systems, once the IP Phones are powered on and registered with the ICP controller (100), the TCP sockets remain open at all times (99.999% availability). An aspect of an exemplary embodiment of CPS is that it is not necessary for a user task to provide such socket bit-mask information each time. Instead, CPS keeps centralized polling socket maps for each caller task, and allows the task to dynamically add/clear the socket from its maps.

Similarly, the standard select service returns the total number of active file descriptors, and an output bit-mask. Thus the caller task must search the bit masks to find which file descriptor is active, which also takes O(N) time. In CPS, this overhead is eliminated since the active file descriptors are kept on the Service List comprising Read and Write Stores. The CPS select call returns the number of active socket fds, and the caller task simply performs "get next" actions to retrieve all active file descriptors.

To illustrate an exemplary embodiment, a polling model for IPBX I/O multiplexing is described, followed by a description of an O(1) time-complexity centralized polling service, and a description of implementation results and performance comparisons.

To bring an offline IP Phone (or IP device) on-line with the ICP (100), there are two consecutive phases: a Signaling Transport Link (STL) Setup phase, and a Device Registration phase. In the STL Setup phase, a TCP Socket connection is established between the remote IP device and the ICP (100), or a TCP 3-way handshake protocol is completed. If a secured link is to be established additional security negotiations are performed as well. In the Device Registration phase, the first segment of application data is sent as the IP phone (e.g. IP Phone 1, IP Phone 2, etc.) initiates a registration protocol with the ICP (100) over the STL. If the protocol transactions are successful, the IP phone will be put to In-Service state by the ICP (100).

After the Device Registration phase, the IP device applications (225) are ready to provide services. For example, IP Phone 1 can make a call to IP Phone 2 by initiating a call processing protocol with the ICP (100) over the STL. If the protocol is successfully completed, the ICP (100) will set up a bi-directional RTP voice streaming path directly between the two phones. Similarly, other services such as maintenance service, heartbeat service, and network management service can all be provided through the corresponding signaling protocols over the STL TCP links.

ICP I/O multiplexing is used to send and receive data through the TCP sockets after STL Setup phase. From an operational service point of view, ICP I/O multiplexing supports three cases: IP Phone Service, IP Trunking Service, and Application Service. The IP Phone Service provides basic iPBX telephony services wherein IP phones (IP Phone 1, IP Phone 2, etc.) initiate TCP connections to ICP (100), and wherein up to 1400 TCP sockets may terminate at a single ICP controller (100). With IP Trunking Service, a cluster of ICPs may also be interconnected through TCP socket connections, for fault-tolerance, networking topology and system service sharing purposes. In this case, the ICP (100) initiates TCP connections to other ICPs. According to the Application Service, other IP Device applications or desk-top applications may have their own TCP connections to the ICP 1 (100) in the event that the IP Phone Service TCP connections cannot be shared.

For the sake of simplicity, the following description of an ICP multiplexing model is set forth for the IP Phone Service and IP Trunking Service cases only, and since they cover all types of TCP socket connections.

In the exemplary MN3300 system, ICP I/O multiplexing is based on a polling model, where a single polling task periodically performs a select call for read/write data on a group of sockets associated for a particular service. For example, the IP Phone Service performs such a polling task while IP Trunking performs another polling task of the same structure. In MN3300 systems, the polling task is implemented as a standard C++ class.

Figure 3:
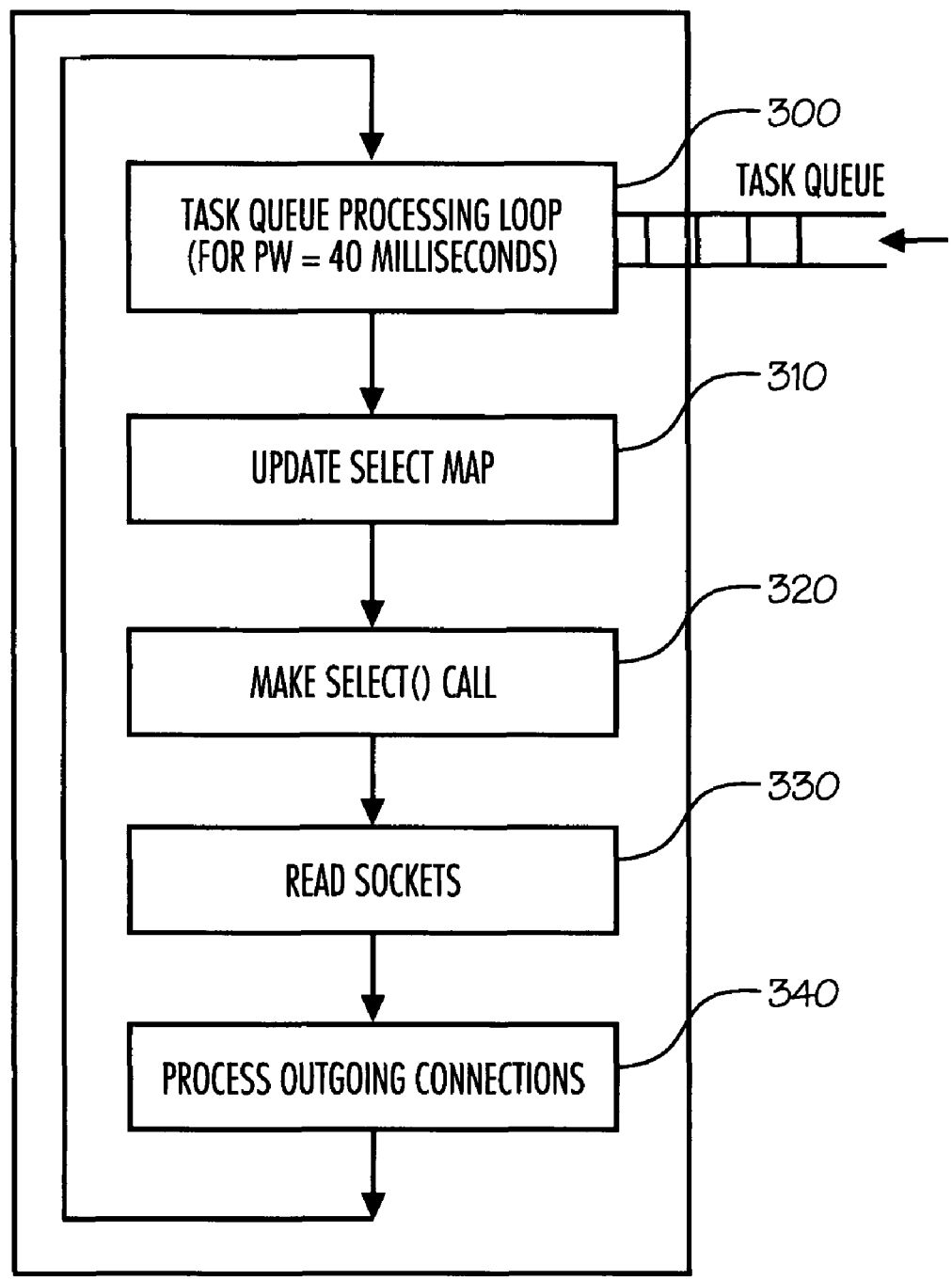
FIG. 3 is a flowchart showing a main task queuing processing loop of the centralized polling service (CPS) of FIG. 2, for an exemplary embodiment.

FIG. 3 shows the functional block diagram of the main loop of the polling task. At step 300, the Task Queue Processing Loop is performed (e.g. every PW=40 milliseconds) on processing messages from its queue or mailbox. As discussed in greater detail below, all of the socket service requests and inter-task communications from the system are handled in this loop. Specifically, the loop at step 300 provides socket state processing and sends out data to the network LAN (130). In a MN3300 system, a socket may at any time assume one of the states from the following Socket-State-Set: SSS=(invalid, listening, connecting, connected, accepting, subscribed, closing, closed). A socket that is in a "listening" state is ready to accept incoming connection requests. A socket in a "connecting" state is ready to make an outgoing connection. The listening sockets are put on the Socket Map for detecting "Read-ready" events (Read Byte Mask) on incoming connection requests (step 310). For the connecting sockets, connection requests are initiated immediately within the loop at step 300. However, if there is no connect response from the far-end, then the socket state "connecting" is recorded and the socket is put on the Socket Map for detecting a "Write-Ready" event (Write Byte Mask), which is later processed (at step 340) for processing outgoing connections. The transmission of data to the network LAN (130) is implemented via a standard BSD "write" operation applied to the given socket. It should be noted that the output socket fd is not put on the Socket Map for detecting "Write-ready" events. The write bit-mask of select ( ) is used for connecting sockets, as discussed above. This is because a local list can be used to track the output status of all known sockets.

Figure 5:
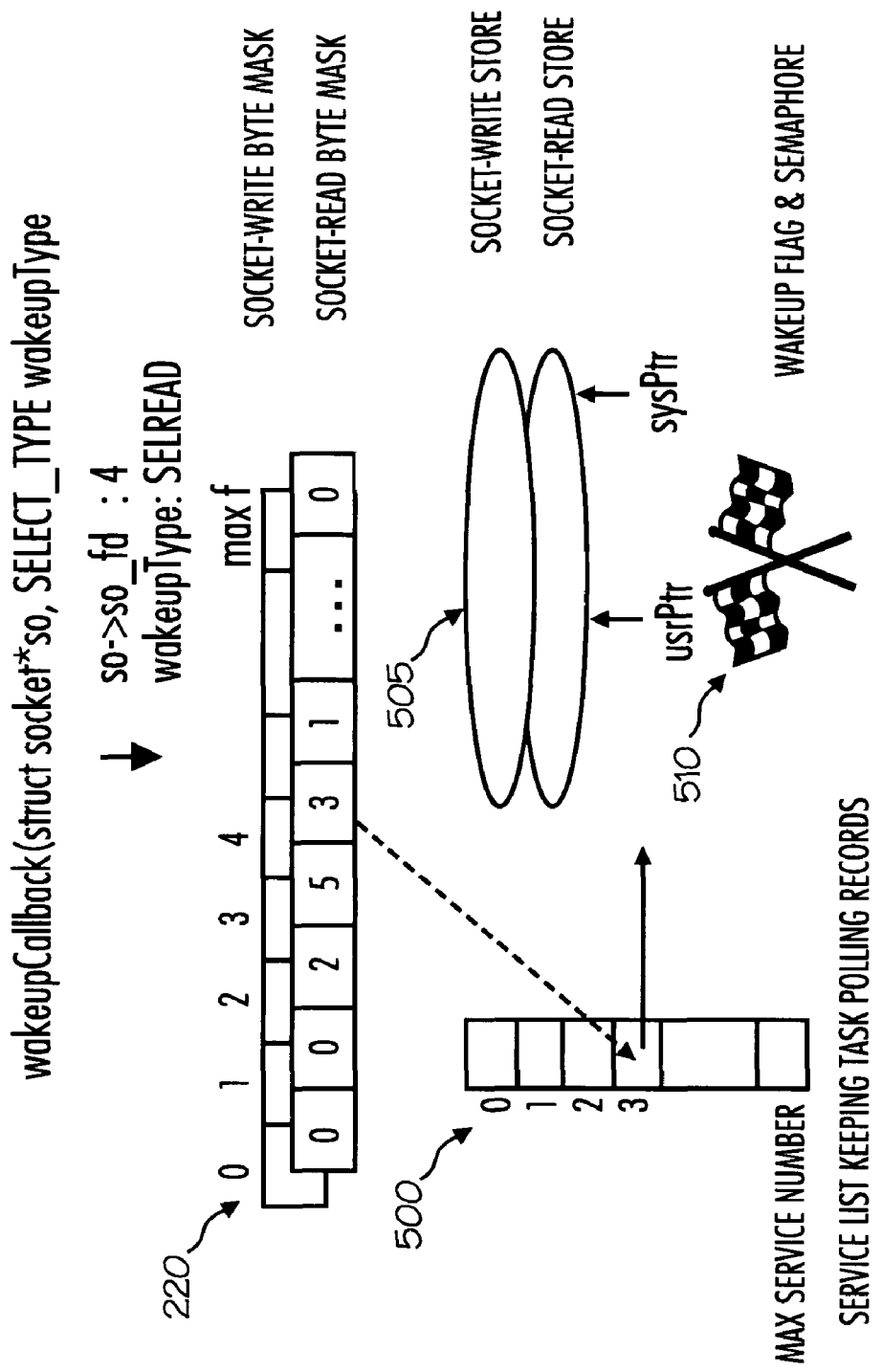
FIG. 5 is a schematic illustration of internal data structures for the centralized polling service (CPS) of FIG. 2.

At step 310, other system maintenance actions are performed and if a socket has been opened or deleted, then the socket record is updated in the Socket Map (220) which, as discussed in greater detail below with reference to FIG. 5, is an array or table data structure for holding all current subscribed socket records and using socket fd as an indexing key. For example, in IP Phone service, 1400 TCP sockets are recorded on this map when 1400 IP phones come on-line.

At step 320, the BSD 4.3 select call is executed, where the timeout value is set to zero such that it is a non-blocking call whether or not there is any socket I/O event. The select call returns all "read-ready" and "write-ready" I/O events, as discussed above.

The sockets are read at step 330, which represents the major "input" part of the I/O multiplexing operation. After select call is returned, the number of active I/O sockets is known. The GetNextReadyFd method in FIG. 4A is used to retrieve socket events. Corresponding actions are taken based on the state of a given socket. For example, if a socket with a read-event is in the "listening" state, then a standard BSD "accept" is applied to the new connection, which creates a new socket and returns a file descriptor (fd) pointing to the new socket. For this new socket, additional socket processing is immediately handed over to a higher level socket handler task so that the polling task can continue to read the next socket. On the other hand, the socket handler task may decide whether or not time-consuming secured connection negotiations (e.g., SSL handshakes) are required. Once this has been completed, a "socket subscripting" request is sent back to the polling task for notification that the socket is ready to receive and transmit application data. It should be noted that the "socket subscripting" message cannot be processed at step 330. Instead, the "socket subscripting" message is processed when the polling task loops back to step 300. If the negotiation is successful, the new socket is then set to a "Subscribed" state and the socket fd is put on the Socket Map (FIG. 5) for detecting read-ready events (Read Byte Mask) to receive the incoming data. If the negotiation fails, the TCP connection is then closed. If the socket is in the "subscribed" state, then a standard BSD "read" action is applied to the socket to receive the application data.

As discussed in connection with "Task Queue Processing Loop" 300, the connecting sockets may have pending connections to complete. If select call (step 320) indicates a write-ready event on a connecting socket, then step 340 is performed to process outgoing connections. As when accepting a connection, if the connection is to be a secured link, a security negotiator task may be notified of the new connection. If the connection is successful, the new subscribed socket is put on the Socket Map for detecting "Read-ready" events. Thereafter, the incoming data on this new link can be received from later polling cycles.

In general, the socket data output function is handled exclusively in the "Task Queue Processing Loop" (step 300); and the socket data input function is performed in "Read Sockets" (step 330). The polling task invokes the select call (step 320) every 40 milliseconds, and provides a comprehensive set of socket services both for accepting client (e.g., IP Phone service) connection requests or for initiating inter-ICP connection requests (e.g. IP Trunking service).

According to an exemplary embodiment, CPS is implemented in C++. The code segment of the CPS API shown in FIG. 4A is executed to access CPS services. Specifically, a polling task calls RegisterForSocketService( ) to register with CPS and receive a valid (larger than zero) "service number". A polling task can also stop using the CPS (for example, at system shut down) by calling DeRegisterForSockService( ). It should be noted that, for system safety and reliability considerations the "task ID" and "service number" have to be used together to access other services of the CPS.

The Add( ) call allows the polling task to add a new socket fd for a given I/O event (READ=0, WRITE=1) to its polling Socket Map. The clear( ) function allows the polling task to remove a socket fd for a given event from its polling Socket Map.

In the normal polling cycle, the CPS select call (step 320) is used by the polling task to find the current total number of active sockets to read or write, respectively. Similar to BSD 4.3 select( ), the CPS select call allows the user task to specify a "timeout" value in milliseconds, which is set to 0 by default for the polling model. Finally, GetNextReadyFd( ) call is used to retrieve the I/O ready file descriptors reported by CPS Select( ) call.

Accordingly, a person of skill in the art will appreciate that CPS models the three-part BSD 4.3 select( ) call functionality as follows: (1) updating input Socket Mask; (2) finding the total number of I/O ready sockets; and (3) retrieving the output sockets. As discussed in greater detail below, every CPS API function call in FIG. 4A is completed in O(1) time.

Turning now to the CPS system interface, according to an aspect of an embodiment of CPS the same asynchronous I/O events are obtained as received by the BSD-select utility within the operating system kernel. The raw input information that the BSD-select receives is needed to write a fast and scalable CPS-select facility. The specific information needed is the active socket file descriptor (fd), and the corresponding I/O event type (READ or WRITE).

As shown in FIG. 4B, a classic implementation of select( ) is utilized wherein the kernel call sowakeup(struct socket *so, struct sockbuf *sb, SELECT_TYPE wakeupType) awakens all processes pending on select( ). A user callback hook is included within the sowakeup( ) call as an alternative for supporting asynchronous I/O. This callback hook is a global function pointer for forwarding struct socket* and SELECT_TYPE (i.e., SELREAD=0, SELWRITE=1), two types of parameters to the user callback function.

FIG. 4B shows that BindingCallbackToKernel( ) is called when CPS is created, and passes wakeupCallback( ) to the kernel so that when sowakeup( ) is executed, wakeupCallback( ) is called out from the kernel. Additional details of the internal CPS actions of wakeupCallback( ) are set forth below. It will be appreciated that the wakeupCallback( )callback is an ISR-like call from the kernel that needs to be executed quickly without being blocked at the user space.

FIG. 5 depicts the internal data structures of CPS, from which it will be noted that CPS is a global object shared by all polling tasks. In CPS, two lists are provided: Socket-Read Byte Mask and Socket-Write Byte Mask, for READ and WRITE events, respectively. As discussed above, for convenience these lists are also referred to as Socket Maps. It should be noted that the Socket Maps can be expanded to include a Socket-Exception Byte Mask to support socket exception service.

A Socket Map is a list with max_fd+1 entries, where max_fd is the maximum number of sockets supported by the system. For example, in an MN3300 system supporting 1400 IP Phones, max_fd is configured to 2000, and the memory cost for two maps is only 4K bytes. In this way, a Socket Map can be indexed by the socket fd. The Socket Map is expressed as an octet (thus called Byte Mask), which is different from the bit mask of the BSD 4.3 select service. For example, a byte-operation is faster than a bit-operation when accessing the Socket Maps using the callback function from the kernel. A Byte Mask that has been initialized to zero (or "empty") may be used by the CPS to record a "service number", which represents a polling task's subscription on the indexed fd for the I/O event associated with the store.

Several observations can be made. First, a Socket Map is logically partitioned by service numbers. All entries with the same service number are associated with a partition, where the service number is the number granted to a polling task at its registration time by the CPS. Second, a Socket Map can accommodate at most 255 polling tasks at the same time. Increasing the entry's size from byte to word effectively eliminates this restriction in CPS. Third, a socket fd cannot be subscribed to by two polling tasks with different service number at the same time. Socket collisions (two applications attempting to read and/or write to the same socket) are thereby prevented in CPS.

BSD4.3 select service is not confined by restrictions such as the third observation, above. Multiple applications can access a socket from two BSD4.3 select( ) calls. Although socket collision is not supported directly by CPS, it can be implemented by an overlay mechanism allowing a list of service numbers to be associated with an entry of the Socket Map. However, in most applications, supporting socket collision is not necessary. In fact, in MN3300 IP PBX systems, the third observation, secure and reliable communications, must be enforced.

As shown in FIG. 5, a "Service List" data structure keeps a list of polling records in CPS. After successfully registering with the CPS, a polling task creates a polling record on the Service List (500), where the service number granted to the polling task is the index of the polling record to the list. If only a few tasks perform networking I/O multiplexing, such as in the exemplary MN3300 ICP controller (100) then, in practical terms, the Service List (500) is very short. CPS registration can be completed in only O(1) time because the length of the Service List (500) is a small constant number. For a large Service List, other suitable data structures (e.g., hash table, free service number pool) can be used. Regardless, a polling task needs to register with CPS only once, during system configuration, before polling the sockets.

A polling record contains all necessary information about a polling task, such as Task ID. Two circular lists (505) are provided: Socket-Read Store (SRS) and Socket-Write Store (SWS). Each store is associated with a Wakeup Flag and a Wakeup Semaphore (binary semaphore depicted schematically at 510), which are not needed to support the MN3300 polling model, i.e., select call with zero timeout, but are set forth to show that CPS can provide generic BSD4.3 select functionality with a non-zero timeout value.

SRS/SWS (505) are used for keeping current read/write ready socket file descriptors for the corresponding polling task. Each store has a sysPtr that points to the current available entry for the system (e.g., kernel callback function) to write a socket fd that has an I/O ready event that has arrived. After each write operation, sysPtr is moved so as to point to the next available entry. Each store also has a usrPtr that points to the current entry that a polling task can read. After each read operation, the current entry is "cleaned" by resetting to 0; and usrPtr is moved so as to point to the next available entry. In a polling model, sysPtr moves forward along the store whenever the system reports a new fd; but usrPtr is only updated after each polling interval when a polling task comes back to catch up with the system's updates.

If the size of SRS/SWS (505) is too small, it is possible that the sysPtr may come around the store and catch up with usrPtr, creating a SRS/SWS Read-Write collision, which must be avoided. However, SRS and SWS collision detection can be achieved by simply checking whether sysPtr points to an entry that has not been "cleaned" (i.e., larger than 0) before the system adds a new I/O ready fd to the store.

Since the maximum call processing traffic pattern and the polling window are known, the required size of SRS and SWS can easily be calculated. In the implementation of FIG. 1, for example, a store size of 1000 is able to support a traffic volume that is three times larger than the maximum operational volume (8000 calls-per-hour). The total memory cost for two stores is only 8 Kbytes.

With the foregoing as background, basic run-time cases are set forth below to illustrate how the above data structures are used in CPS algorithms for providing a set of polling services.

Figure 6:
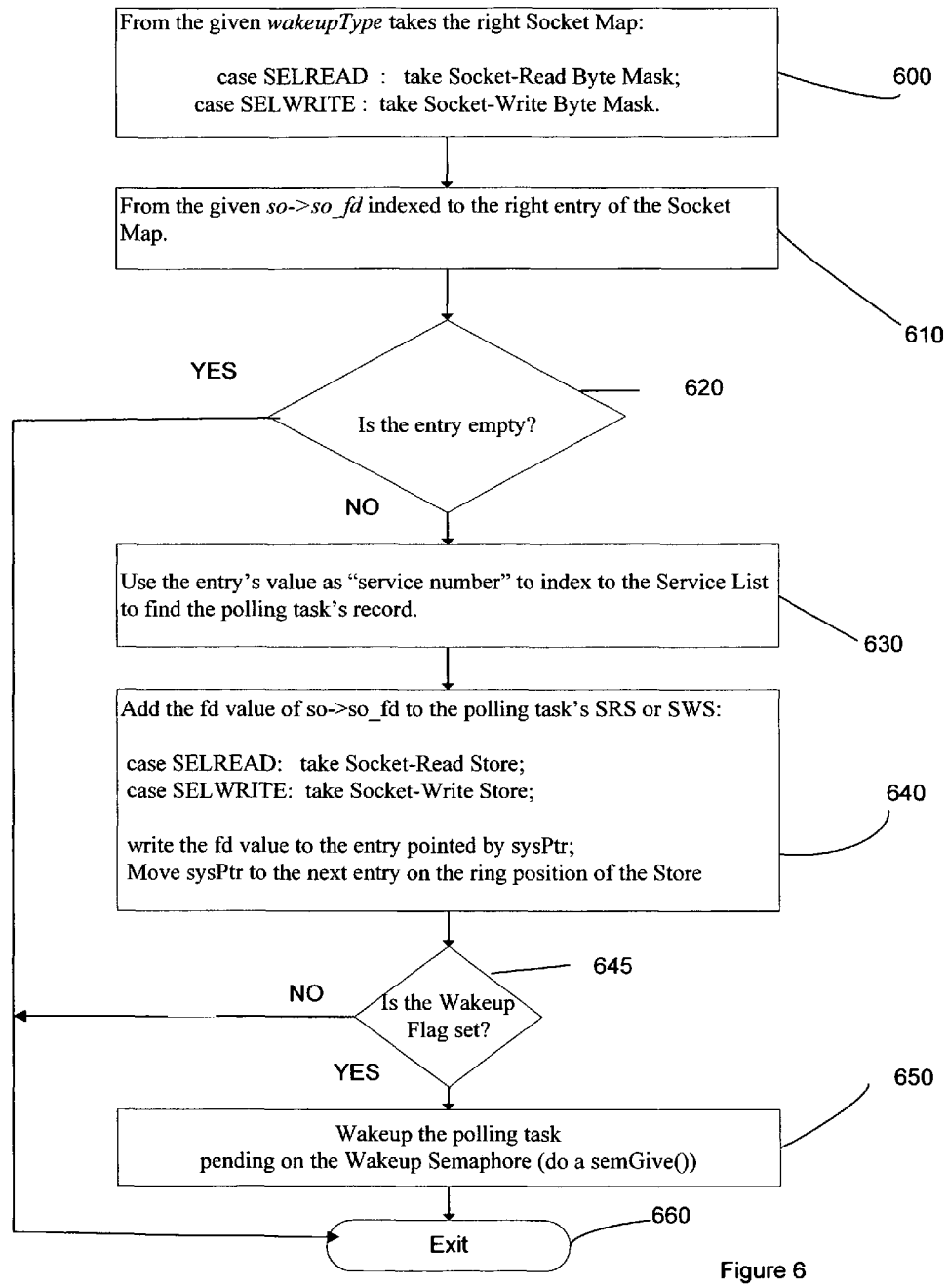
FIG. 6 is a flowchart showing a wake-up call back process of the centralized polling service (CPS) of FIG. 2.
Figure 7:
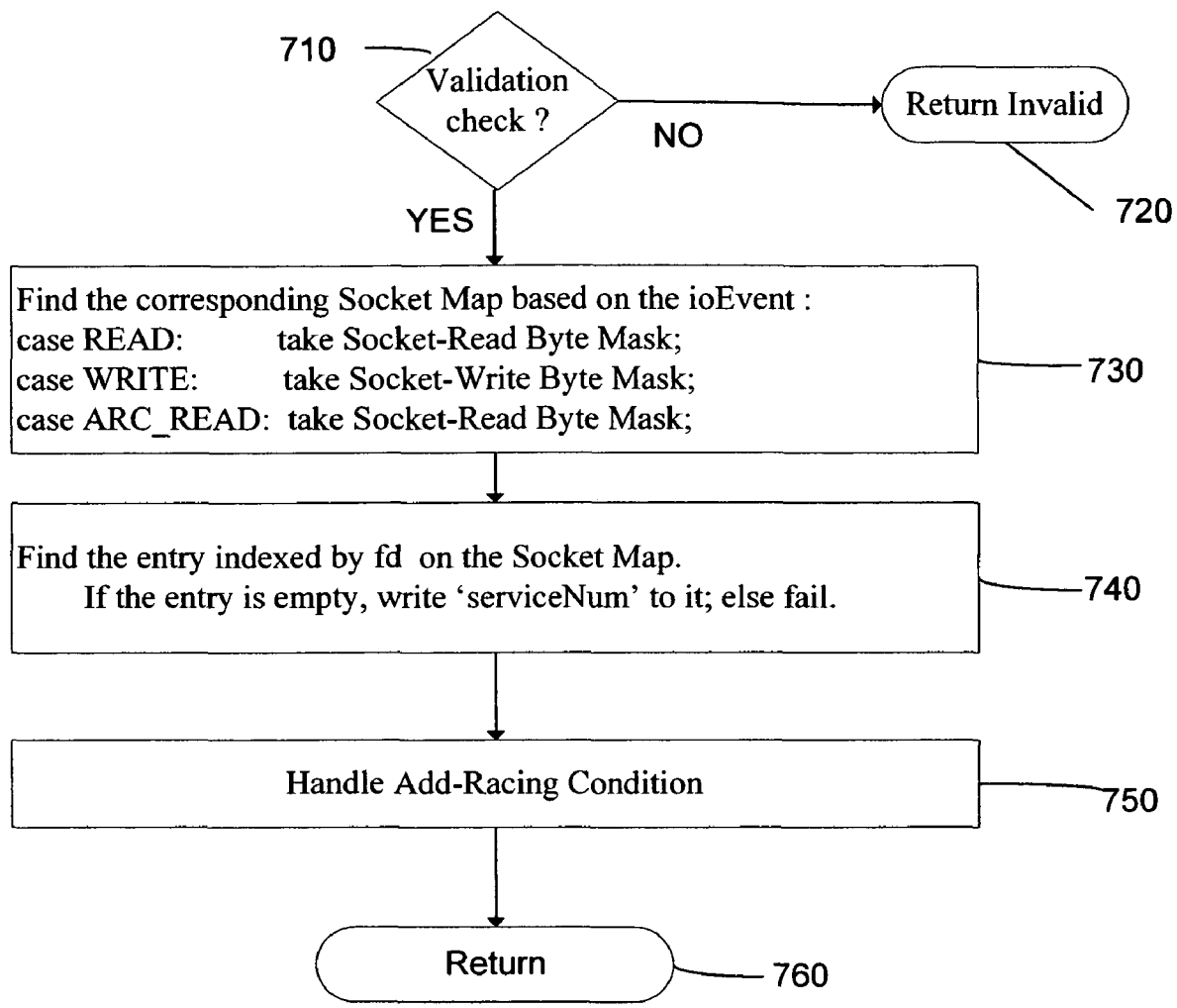
FIG. 7 is a flowchart showing a polling task of the centralized polling service (CPS) of FIG. 2 for adding a new socket.

As shown in FIGS. 6 and 7, when wakeupCallback (struct socket *so, SELECT_TYPE wakeupType) is called out from the VxWorks kernel, it indicates that a file descriptor fd has an I/O event SELREAD or SELWRITE (step 600 in the flowchart of FIG. 6).

At step 610, from the given so→so_fd indexed to the right of the Socket Map (220) in FIG. 5, if the entry is empty (a "YES" at step 620), then the call exits (step 660). Otherwise, the value of the entry is used as the "service number" to index the Service List (500) to find the relevant record for the polling task (step 630).

At step 640, the file descriptor (fd) is added directly to the polling task's fd list which is ready to be retrieved. Step 650 is skipped over in the event that the Wakeup Flag is not set (i.e. a "NO" determination at step 645). For the polling model, where the CPS select call has a timeout value of zero (i.e. a "YES" determination that the Wakeup Flag has been set at step 645), the polling task is awakened (step 650). Step 650 illustrates that the CPS polling service can model all standard BSD select services.

It is evident that every single step in FIG. 6 takes O(1) time.

It will be recalled from FIG. 5 that each record in the Service List (500) contains read and write event stores (505) for each service number. In addition, each record contains the Wakeup Flag and Wakeup Semaphore (510) for that service number. These entities impart the ability of CPS to provide the time out functions supplied by the standard BSD select call. If CPS receives a select call from an application that supplies a time out value other than 0, it sets the Wakeup Flag and pends the call on the Wakeup Semaphore, thereby providing a time out function as supplied by BSD Unix.

A polling task uses the CPS API RegisterForSockService (int taskId, int& serviceNum) to register with the CPS, wherein taskId can be any unique number identifying the caller, and a reference of serviceNum allows the caller to receive a "service number" from the CPS. Upon receiving the registration request, CPS checks its Service List (500) to find the index of the next empty entry. A polling record is then set up, and the index value is assigned to serviceNum.

When de-registering from the CPS (i.e. using the DeRegisterForSockService(int taskId, int serviceNum) call), the registered polling record, directly indexed by the given serviceNum, is cleared or deleted.

FIG. 7 is a flowchart illustrating a polling task for adding a new socket. First, a validation check is performed (step 710) by comparing the given taskId against the stored taskId; if this check is passed, then its service number is marked on the given socket fd entry of the Socket Map (220). Otherwise, the check returns "INVALID" (step 720). The computational complexity of this call is trivial.

A polling task uses the CPS API Add (int fd, int ioEvent, int serviceNum, int taskId) to add a new socket fd against an interested soEvent (READ=0, WRITE=1) for a polling task identified by serviceNum and tasked.

In the MN3300 polling model of FIG. 2, after replacing the BSD select service with the CPS service, CPS Add( ) is called from the Task Queue Processing Loop of step 300 (FIG. 3), in the three cases shown at step 730:

case READ: add a "listening" socket for read-event
case WRITE: add a "connecting" socket for write-event
case ARC_READ: add a "subscribed" socket for read-event In step 740, the new serviceNum can be written into the entry if and only if the entry has not been taken by any polling task. This provides protection against a "socket collision", as discussed above.

The algorithm of FIG. 7 takes O(1) time, provided that step 750 (handling Add-Racing-Condition (ARC)), is completed in a constant time. Consequently, it will be appreciated that ARC constitutes a challenge in developing a fast and scalable O(1) CPS-select (or polling) service. The following is an explanation of what ARC is and how it is solved in constant time according to CPS.

Consider the example of adding a "subscribed" socket for a read-event (i.e., case ARC_READ). When a TCP connection arrives on a listening socket, the socket becomes readable. The polling task accepts the connection by creating a new socket for the connection, and returns a file descriptor pointing to the new socket. This is done in the "Read Sockets" block (step 330 in FIG. 3). However, the polling task cannot immediately call CPS Add( ) since it has to pass additional processing, such as secured negotiations, to the higher level tasks. Once the higher level tasks have completed such "additional processing", a "socket subscribing" message is sent back to the polling task, which is handled in the first block (step 300) of the main processing loop. Eventually, the polling task calls the CPS Add( ) with ioEvent=ARC_READ.

In the above scenario, there is a random time interval between the time that the connection negotiation has been completed and the CPS Add( ) call is initiated. During this time, the far-end IP phone (FIG. 1) is ready to send the first segment of application data, but the CPS Socket-Read Byte Mask (220) has not yet been set. If the IP Phone's application data arrives during this time interval, the kernel will invoke the CPS wakeupCallback( ) function, which exits at step 620 of FIG. 6, giving rise to the ARC problem namely—the application data is consequently lost.

The standard BSD select service has no such problem, because the BSD select( ) call checks, at the kernel level, if any I/O event has already arrived for the sockets given by the input socket bit-mask. In order to avoid the O(N) sequential searches and to achieve O(1) time-complexity performance, the ARC problem is solved by the CPS API Add( ) which directly adds the socket fd to the polling task's Socket-Read Store (505) thereby compensating for any missed updating of the SRS by wakeupCallback( ).

Therefore, step 750 (handling Add-Racing-Condition (ARC)), finds the polling record indexed by the serviceNum, writes the fd to the entry pointed by sysPtr on the SRS, and moves sysPtr to point to the next entry on the store (505).

It will be apparent that step 750 may be performed in O(1) time. Thus, the time-complexity of the CPS Add algorithm shown in FIG. 7 is O(1). A person of skill in the art will appreciate that performance of step 750, within the exemplary MN3300 system, allows up to 1400 IP phones to reliably come online.

Since ARC relates to a racing condition, it is also possible that CPS Add( ) may sometimes be called before the first segment of 'application data' arrives on a new connection. In this case, wakeupCallback( ) updates the SRS (505) such that, at step 750, a duplicated socket fd read event is added to the SRS, leading to at most one 'read miss' on a subscribed socket when 0 bytes of data is read.

Figure 8:
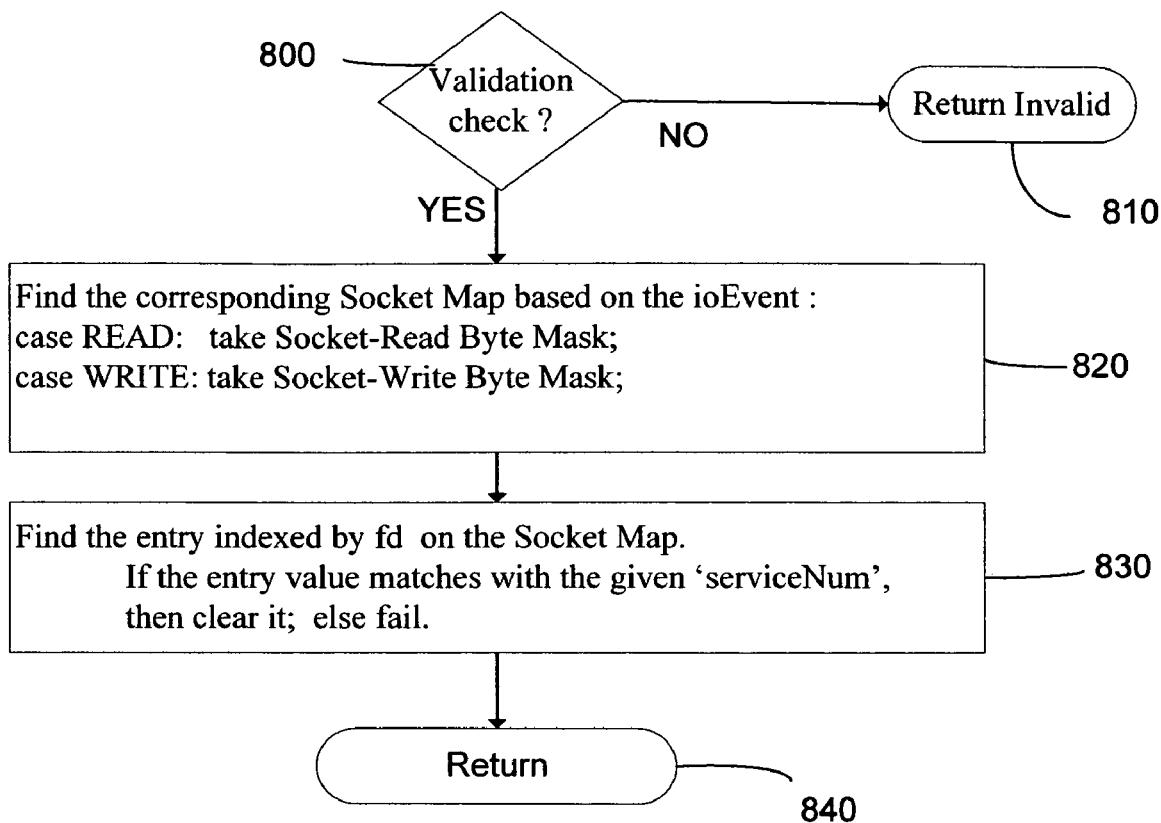
FIG. 8 is a flowchart showing a polling task of the centralized polling service (CPS) of FIG. 2 for removing or clearing a socket.

As shown in FIG. 8, a polling task uses CPS API Clear(int fd, int ioEvent, int serviceNum, int taskId) to remove or clear a previously added socket fd against an interested ioEvent (READ=0, WRITE=1) for a polling task identified by serviceNum and taskId. When a TCP connection is down, this function is used to remove the TCP socket from the polling task's Socket Map (500).

A validation check is performed (step 800) by comparing the given taskId against the stored taskId; if a match is found, then this check is passed and the polling record is removed from the Service List. Otherwise, the check returns "INVALID" (step 810). Step 820 is similar to step 730 in FIG. 7.

Step 830 in FIG. 8 provides protection for the Socket Map (500) since only the polling task with an identical service number can clear its own Socket Map entry. The CPS Clear( ) method ends at step 840. A person of skill in the art will appreciate that CPS Clear( ) is simpler than CPS Add( ), and is also an O(1) algorithm.

Figure 9:
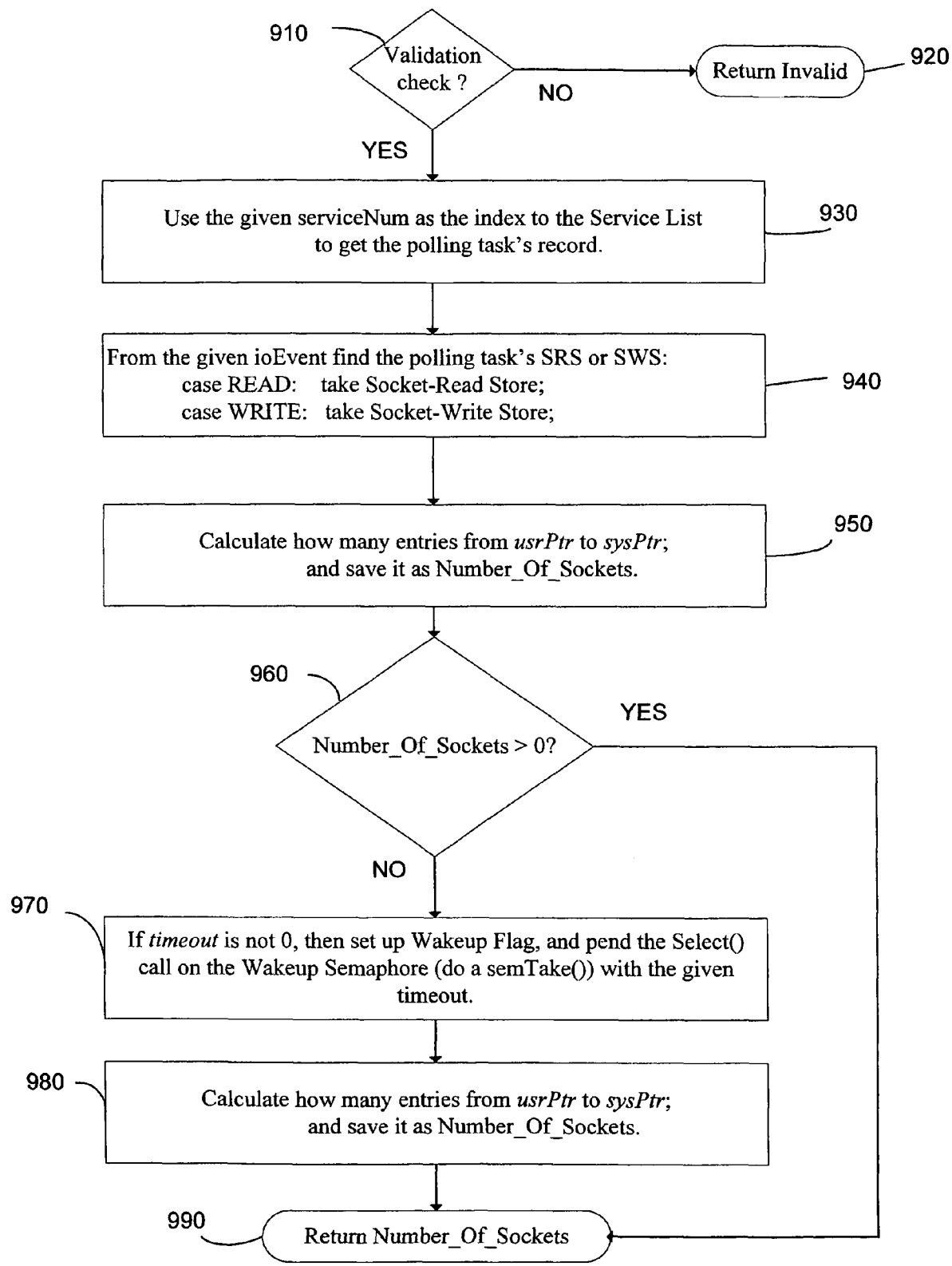
FIG. 9 is a flowchart showing a select call process of the centralized polling service (CPS) of FIG. 2 for returning the number of available sockets.

The CPS Select (int ioEvent, int serviceNum, int taskId, int timeout=0) call returns the number of active sockets available for a given ioEvent. FIG. 9 shows its algorithm design in an exemplary embodiment of CPS.

A validation check is performed (step 910) by comparing the given taskId against the stored taskId; if a match is found, then this check is passed and the polling record is removed from the Service List. Otherwise, the check returns "INVALID" (step 920).

At step 930, the value of the "service number" is used to index the Service List (500) to find the relevant record for the polling task.

Then, at step 940, the corresponding polling task's SRS/SWS (505) are determined from a given ioEvent.

The major function of the CPS select occurs at step 950, wherein a fixed number of arithmetic operations are carried out to determine how many entries exist between two pointers on the store. A store with M entries is implemented by a linear array of M entries with modulo operations to circulate back from the last entry to the first entry.

Similar to step 660 of the wakeupCallback flowchart shown in FIG. 6, step 970 in FIG. 9 is not necessary for the MN3300 polling model, but is nonetheless described herein to show how the CPS select can fully model BSD select. In the MN3300 polling model, the polling task is used to call BSD select every 40 milliseconds. However, the polling task is able to call CPS select every 20 milliseconds since CPS select is more efficient than BSD select. CSP select is an O(1) algorithm, as demonstrated above.

After the call wakeup of step 970, step 950 is performed once more (step 980) and the number of sockets is returned (step 990).

It should be noted that the CPS select call does not require an input socket bit-mask or an output socket bit-mask, both of which are built-in data structures described in connection with FIG. 5.

Figure 10:
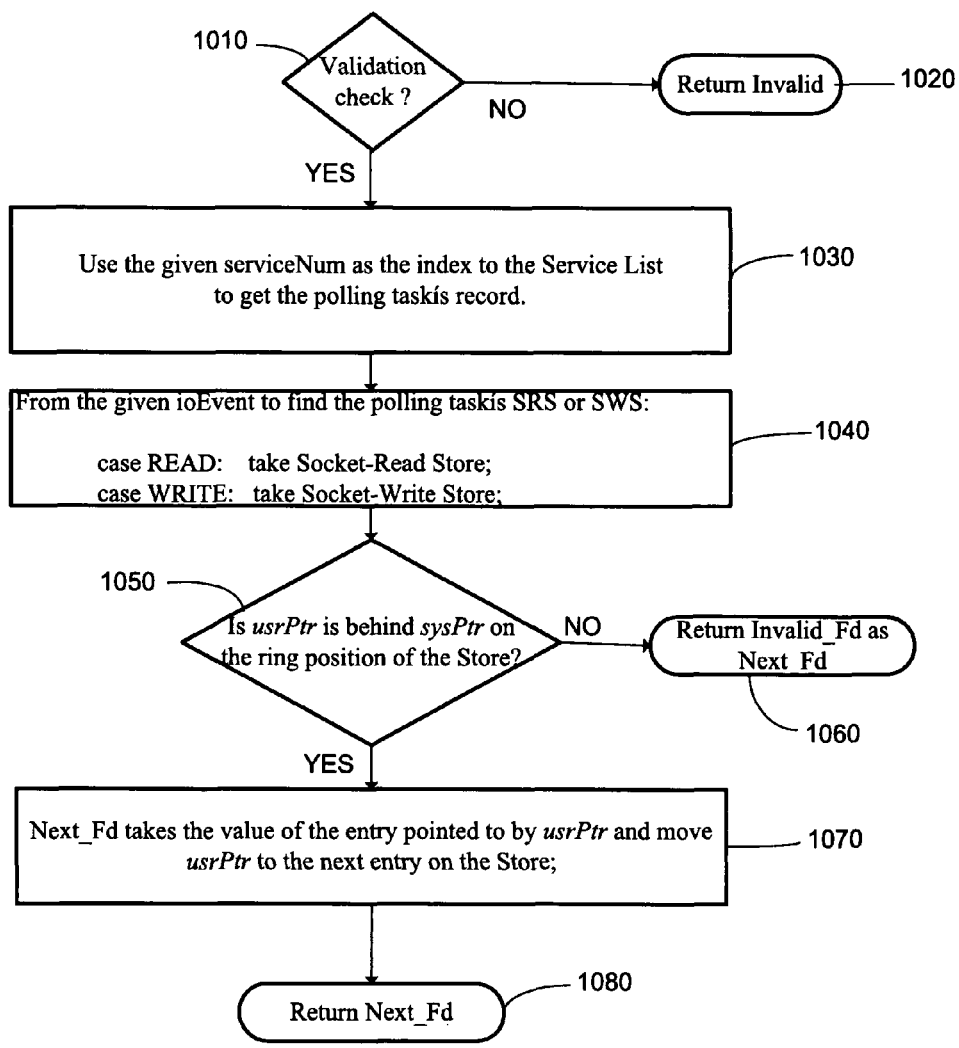
FIG. 10 is a flowchart showing a get next API of the centralized polling service (CPS) of FIG. 2 for returning one socket file descriptor at a time.

FIG. 10 illustrates how the active sockets reported by CPS select are retrieved using the GetNextReadyFd (int ioEvent, int serviceNum, int taskId) API, one socket fd at a time. The polling task of FIG. 2 can repeat this call as many times as indicated by Select( ), although extra calls, while still being 'safe', may return "Invalid fd" (i.e. a negative integer value).

A validation check is performed (step 1010) by comparing the given taskId against the stored taskId; if a match is found, this check is passed. Otherwise, the check returns "INVALID" (step 1020).

At step 1030, the value of the "service number" is used to index the Service List (500) to find the relevant record for the polling task.

Then, at step 1040, the corresponding polling task's SRS/SWS (505) are determined from the given ioEvent.

The major function of the CPS GetNextReadyFd occurs at steps 1050 through 1080, wherein a constant number of arithmetic operations are used to check whether usrPtr is "behind" sysPtr, thereby ensuring that usrPtr never goes beyond sysPtr for the ring store. In short, GetNextReadyFd( ) takes O(1) time to get an I/O ready socket fd. In BSD select, it takes O(N) time to find a ready socket by sequentially searching the output socket bit-mask.

In summary, the seven cases (Wakeup Callback from the kernel; Registering with the CPS; De-register from the CPS; Add socket to the Socket Map; Remove the socket from the Socket Map; CPS Select call and Retrieve the I/O Ready socket) described above with reference to FIGS. 7-11, set forth an exemplary embodiment of the CPS API and CPS. Each of the foregoing cases is implemented with O(1) time-complexity. That is, no matter how many sockets or file descriptors are involved in I/O multiplexing, CPS always takes constant-time to respond to each CPS service request. From a computational point of view, CPS is an optimal solution for I/O multiplexing.

Experimental test results have been obtained using a standard MITEL MN3300 IP PBX system, where the PBX switching platform (i.e., ICP Controller (100) in FIG. 1) incorporated a 450 MHz PowerPC 603e CPU and 512 MB main memory, to support up to 1400 IP phones.

During tests of 500, 1000, and 1400 phones, the online IP phones generated 6000 calls-per-hour signaling traffic to the ICP Controller (100) across the TCP/IP network (130). Measurements of the execution times were taken for BSD select and CPS select for each of the above-described cases.

Figure 11:
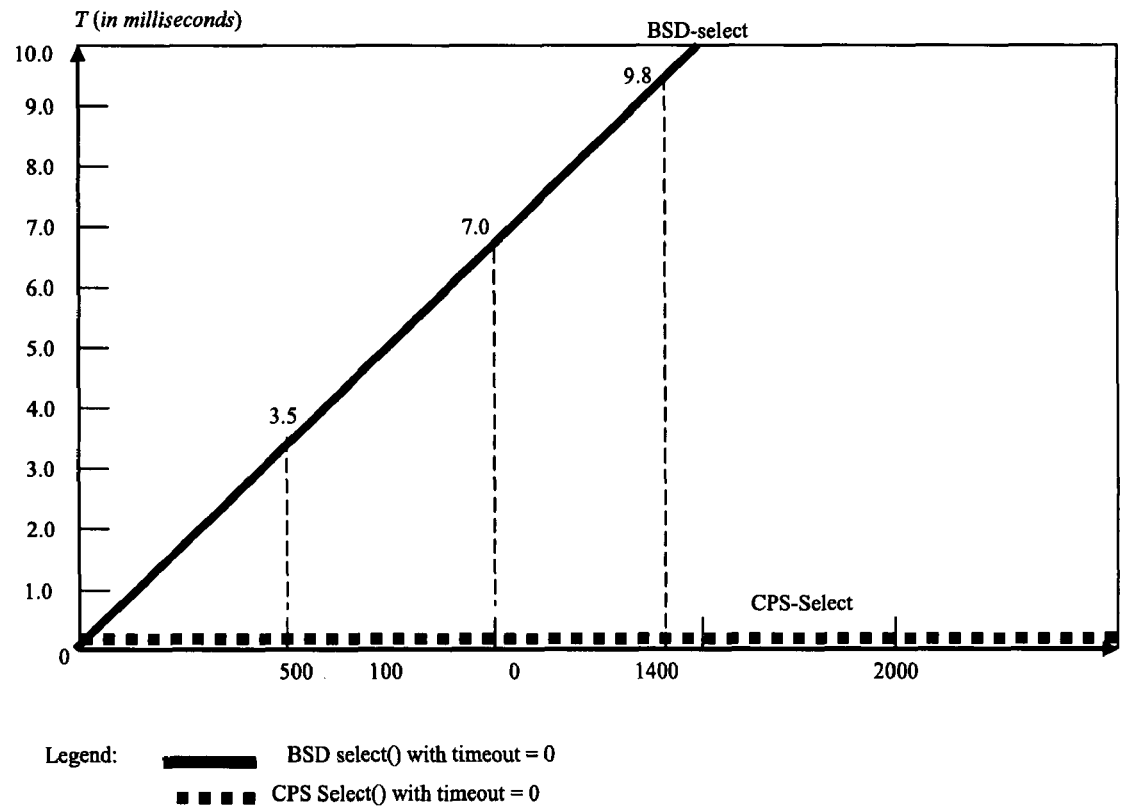
FIG. 11 shows the results of experimental test results of time measurements for CPS select as compared to BSD select.

FIG. 11 shows the results of these time measurements, from which it will be noted that CPS select always takes about 8 microseconds, whereas BSD select requires a length of time that is directly proportional to the number of IP phones. For example, for 1400 IP phones, BSD select requires 9.8 milliseconds, which is 1000 times more than the time required for the CPS select.

I/O multiplexing is one of the major performance bottlenecks in iPBX systems such as the MN3300 system discussed herein. Among hundreds of tasks in the system, the IP Phone polling task itself consumes about 30% CPU cycles for 1400 phones. With the CPS algorithms set forth herein, the polling task demands only a small and constant CPU usage ratio; wherein the major CPU consumption relates to handling the task queue messages (step 300 in FIG. 3) and reading data from the selected sockets. As long as the total IP PBX traffic volume does not change, increasing the number of IP phones does not increase the polling task's CPU overhead.

To summarize, a fast and scalable I/O multiplexing method is set forth for direct implementation in VoIP PBX and other collaborative systems. The centralized polling service (CPS) set forth herein is characterized by the following: an O(1) algorithmic solution optimized for I/O multiplexing that is applicable to general TCP/IP Client-Server networking architectures; which is a generic solution capable of modeling standard BSD select service and which is portable across all VxWorks platforms.

Large systems with up to 10,000 IP phone lines can be developed in a cost-effective manner. Existing legacy MN3300 systems can be upgraded to double the line size without requiring more powerful CPU hardware architectures. Also, I/O multiplexing overhead in large switching systems has been a challenging issue in the industry. Designing special-purpose VLSI chips and hardware architectures for I/O multiplexing represents another technological direction to speed up data transfer and reduce CPU loading. The CPS set forth herein provides a set of algorithms implemented in C++ as a cost effective software solution to this problem.

The present specification sets forth an exemplary embodiment. Other embodiments, variations and applications are possible. For example, the CPS set forth herein originated from solving I/O multiplexing problems in a distributed client-server system based on TCP connections. However, CPS may be used in distributed client-server systems based on UDP connections as well; and may be applied to hybrid architectures with mixed connection types with TCP sockets, UDP sockets, and other network connection types supported by the platforms.

Also, although the CPS set forth herein addresses VxWorks operating system platforms, it can be applied to I/O multiplexing in other operating systems having similar asynchronous I/O event services with both file descriptor and event type information. For instance, it is possible to use the CPS service on Linux platforms after modifying the Linux operating system kernel to provide a similar I/O wakeup call feature as VxWorks.

Furthermore, although the CPS is applied to IP-PBX (iPBX) systems in this specification, a person of skill in the art will understand that CPS can be applied to other switching systems. Many IT or Internet service providers offer various commercial services (e.g., search services, directory services, banking services, marketing services, etc.) for large numbers of users based on a "client-server" architecture on distributed networking systems (TCP/IP, or other legacy networks). I/O multiplexing performance at the server side is closely related to the server throughput and response performance. Accordingly, the CPS as set forth herein can help to build large scalable servers and provide cost-effective services in many different commercial applications.

Many features and advantages are apparent from the detailed specification herein and it is intended by the appended claims to cover all such features and advantages. Further, since numerous modifications and changes will readily occur to those skilled in the art, it is not desired to limit the claim scope to the exact construction and operation illustrated and described, and accordingly all suitable modifications and equivalents may be resorted to, falling within the scope of the claims.

What is claimed is:

1. A centralized polling system for providing constant time select call functionality to a plurality of polling tasks in an operating system kernel, comprising a non-transitory computer-readable medium including:

a system interface to the operating system kernel providing a callback function for returning active sockets and corresponding read/write event types;

a data structure for maintaining a profile for each of said polling tasks including a service number associated with each of said polling tasks, and current read and write ready sockets for each of said polling tasks, said data structure further includes a socket-read and socket-write byte mask corresponding to read/write event types for each one of said polling tasks, each said socket-read and socket-write byte mask being indexed by an associated file descriptor subscribed to by said one of said polling tasks and containing the associated service number therefore, and a service list containing polling records indexed by each said service number, each of said polling records includes a task ID for identifying said one of said polling tasks, and circular socket-read and socket-write stores containing current read and write ready sockets for said one of said polling tasks, and wherein each of said circular socket-read and socket-write stores is indexed by a system pointer to a current available entry for said callback function to write a file descriptor for which an I/O ready event has arrived, and a user pointer to a current available entry for said one of said polling tasks to read; and an application programming interface for registering said polling tasks, receiving said active sockets and said corresponding read/write event types via said system interface, updating said profile within said data structure for each of said polling tasks, and returning said current read and write ready sockets to respective ones of said polling tasks in a time that is not related to total number of sockets being polled, and further including code for (i) registering each said one of said polling tasks for socket services and in response allocating said associated service number and task ID, (ii) de-registering each said one of said polling tasks from said socket services, (iii) adding said associated file descriptor to said socket-read and socket-write byte mask for each of said read/write event types, respectively, (iv) for clearing said associated file descriptor from said socket-read and socket-write byte mask for each of said read/write event types, respectively, (v) determining a total number of said active sockets corresponding to said read/write event types, (vi) returning said active sockets corresponding to said read/write event types to respective ones of said polling tasks, and (vii) accessing each respective one of said polling records via said associated service number, writing said file descriptor to an appropriate entry of the associated circular socket-read store pointed to by said system pointer, and incrementing said system pointer, thereby preventing an add-racing-condition.

2. The centralized polling system of claim 1, wherein said code for determining a total number of said active sockets corresponding to said read/write event types comprises a select function call.

3. The centralized polling system of claim 2, wherein said select function call has a predetermined timeout value.

4. The centralized polling system of claim 3, wherein a default of said timeout value is zero.

5. The centralized polling system of claim 2, wherein said select function call includes code for determining said total number of active sockets by counting the number of entries in respective ones of said circular socket-read and socket-write stores between said user pointer and said system pointer.

6. The centralized polling system of claim 1, wherein said code for returning said active sockets comprises a get next function call.

7. The centralized polling system of claim 6, wherein said get next function call includes code for retrieving and returning respective entries in said circular socket-read and socket-write stores pointed to by said user pointer and incrementing said user pointer in the event said user pointer lags said system pointer, and otherwise returning an indication that no further I/O ready events have been recorded.

8. The centralized polling system of claim 1, further including an overlay mechanism for allowing a list of service numbers to be associated with a single entry of each said socket-read and socket-write byte mask.

9. A centralized polling method for providing constant time select call functionality to a plurality of polling tasks in an operating system kernel, comprising:
  providing a callback function for returning active sockets and corresponding read/write event types;
  maintaining a profile for each of said polling tasks including a service number associated with each of said polling tasks, and current read and write ready sockets for each of said polling tasks;
  maintaining a service list containing polling records indexed by each said service number, wherein each of said polling records includes a task ID for identifying said one of said polling tasks, and circular socket-read and socket-write stores containing current read and write ready sockets for said one of said polling tasks;
  indexing each of said circular socket-read and socket-write stores by a system pointer to a current available entry for said callback function to write a file descriptor for which an I/O ready event has arrived, and by a user pointer to a current available entry for said one of said polling tasks to read;
  registering said polling tasks;
  receiving said active sockets and corresponding read/write event types;
  updating said profile for each of said polling tasks; and
  returning said current read and write ready sockets to respective ones of said polling tasks in a time that is not related to total number of sockets being polled,
  wherein returning said active sockets comprises a get next function call and said get next function call includes retrieving and returning respective entries in said circular socket-read and socket-write stores pointed to by said user pointer and incrementing said user pointer in the event said user pointer lags said system pointer, and otherwise returning an indication that no further I/O ready events have been recorded.

10. The centralized polling method of claim 9, wherein said maintaining the profile for each of said polling tasks includes:
  maintaining a socket-read and socket-write byte mask corresponding to said read/write event types, respectively, for each one of said polling tasks, each said socket-read and socket-write byte mask containing the associated service number for each one of said polling tasks; and
  indexing each said socket-read and socket-write byte mask by an associated file descriptor subscribed to by said one of said polling tasks.

11. The centralized polling method of claim 10, wherein said updating includes:
  adding said associated file descriptor to said socket-read and socket-write byte mask for each of said read/write event types, respectively;
  clearing said associated file descriptor from said socket-read and socket-write byte mask for each of said read/write event types, respectively; and
  determining a total number of said active sockets corresponding to said read/write event types.

12. The centralized polling method of claim 11, wherein said adding includes accessing each respective one of said polling records via said associated service number, writing said file descriptor to an appropriate entry of the associated circular socket-read store pointed to by said system pointer, and incrementing said system pointer, thereby preventing an add-racing-condition.

13. The centralized polling method of claim 11, wherein determining the total number of said active sockets comprises a select function call.

14. The centralized polling method of claim 13, wherein said select function call has a predetermined timeout value.

15. The centralized polling method of claim 14, wherein a default of said timeout value is zero.

16. The centralized polling method of claim 13, wherein said select function call includes determining said total number of said active sockets by counting the number of entries in respective ones of said circular socket-read and socket-write stores between said user pointer and said system pointer.

17. The centralized polling method of claim 9, further comprising associating at least one additional service number with each of said polling tasks.

18. A centralized polling system for providing constant time select call functionality to a plurality of polling tasks in an operating system kernel, comprising a non-transitory computer-readable medium including:
  a system interface to the operating system kernel providing a callback function for returning active sockets and corresponding read/write event types;
  a data structure for maintaining a profile for each of said polling tasks including a service number associated with each of said polling tasks, and current read and write ready sockets for each of said polling tasks, said data structure further includes a socket-read and socket-write byte mask corresponding to read/write event types for each one of said polling tasks, each said socket-read and socket-write byte mask being indexed by an associated file descriptor subscribed to by said one of said polling tasks and containing the associated service number therefore, and a service list containing polling records indexed by each said service number, each of said polling records includes a task ID for identifying said one of said polling tasks, and circular socket-read and socket-write stores containing current read and write ready sockets for said one of said polling tasks, and wherein each of said circular socket-read and socket-write stores is indexed by a system pointer to a current available entry for said callback function to write a file descriptor for which an I/O ready event has arrived, and a user pointer to a current available entry for said one of said polling tasks to read; and
  an application programming interface for registering said polling tasks, receiving said active sockets and said corresponding read/write event types via said system interface, updating said profile within said data structure for each of said polling tasks, and returning said current read and write ready sockets to respective ones of said polling tasks in a time that is not related to total number of sockets being polled, and further including code for (i) registering each said one of said polling tasks for socket services and in response allocating said associated service number and task ID, (ii) de-registering each said one of said polling tasks from said socket services, (iii) adding said associated file descriptor to said socket-read and socket-write byte mask for each of said read/write event types, respectively, (iv) for clearing said associated file descriptor from said socket-read and socket-write byte mask for each of said read/write event types, respectively, (v) determining a total number of said active sockets corresponding to said read/write event types, and (vi) returning said active sockets corresponding to said read/write event types to respective ones of said polling tasks, wherein returning said active sockets comprises a get next function call and said get next function call includes retrieving and returning respective entries in said circular socket-read and socket-write stores pointed to by said user pointer and incrementing said user pointer in the event said user pointer lags said system pointer, and otherwise returning an indication that no further I/O ready events have been recorded.

19. The centralized polling system of claim 18, wherein said code for adding includes code for accessing each respective one of said polling records via said associated service number, writing said file descriptor to an appropriate entry of the associated circular socket-read store pointed to by said system pointer, and incrementing said system pointer, thereby preventing an add-racing-condition.

* * * * *